United States Patent [19]

Yanagisawa et al.

[11] Patent Number: 5,291,370
[45] Date of Patent: Mar. 1, 1994

[54] COMPACT DATA PROCESSOR HAVING A TILTING AND SLIDING DISPLAY

[75] Inventors: Toshinobu Yanagisawa, Kyoto; Shingo Takimoto, Uji, both of Japan

[73] Assignee: Shimadzu Corporation, Kyoto, Japan

[21] Appl. No.: 2,889

[22] Filed: Jan. 11, 1993

[30] Foreign Application Priority Data

Jan. 24, 1992 [JP] Japan .................................. 4-010815

[51] Int. Cl.$^5$ ............................ H05K 7/16; G06F 1/16
[52] U.S. Cl. ...................................... 361/681; 248/286; 248/920
[58] Field of Search ............... 248/286, 917–923; 340/700, 711; 364/708, 708.1; 312/223.2; 361/679–687, 724–727, 752, 755, 796; 400/680, 691–693

[56] References Cited

U.S. PATENT DOCUMENTS

| | | | |
|---|---|---|---|
| 4,720,781 | 1/1988 | Crossland et al. | 340/700 X |
| 4,960,256 | 10/1990 | Chihara et al. | 364/708 X |
| 5,103,376 | 4/1992 | Blonder | 364/708 X |
| 5,168,426 | 12/1992 | Hoving et al. | 361/683 |
| 5,209,448 | 5/1993 | Hatanaka et al. | 248/919 X |

FOREIGN PATENT DOCUMENTS 4-218820 8/1992 Japan ............................ G06F 1/16

*Primary Examiner*—Leo P. Picard
*Assistant Examiner*—Michael W. Phillips
*Attorney, Agent, or Firm*—Oliff & Berridge

[57] ABSTRACT

A data processor composed of: a main body including a CPU, a keyboard provided at the top of the main body, a pair of sliding rails provided at both sides of the keyboard, a pair of sliders each for sliding on one of the sliding rails, a lid pivotably connected to the sliders and a display panel attached on one face of the lid. When the data processor is not used, the sliders are moved to the rear end, and the lid is tilted down, whereby the keyboard is covered by the lid. When the keyboard is used, the lid is raised up with the sliders at the rear end. After the keyboard operation is finished, the sliders are (and the lid is) moved to the front end. When the lid is tilted down with the sliders at the front end, the data processor becomes compact and the display panel can be seen from the outside. Since the keyboard is covered by the lid, the keys are secured from mistouches, and the operator can see the display without bending low.

12 Claims, 6 Drawing Sheets

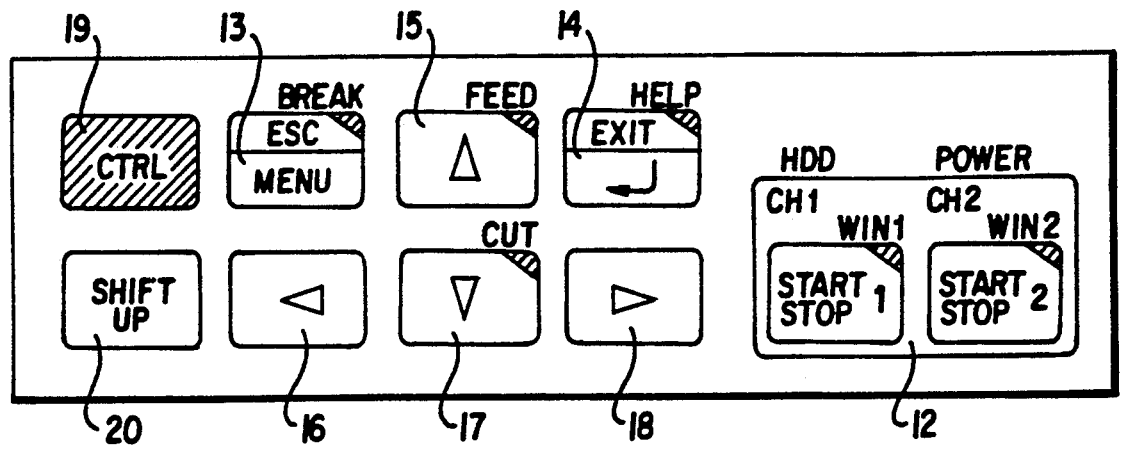
Fig. 10
Fig. 11
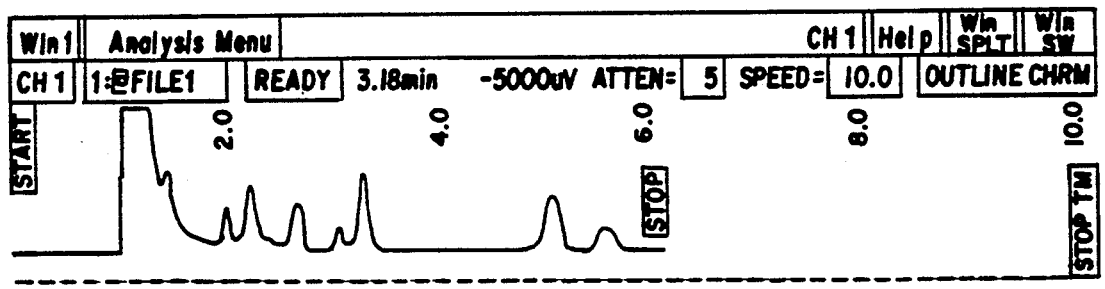

COMPACT DATA PROCESSOR HAVING A TILTING AND SLIDING DISPLAY

The present invention relates to a compact (otherwise called a laptop type or a notebook type) data processor, especially that for connecting to an analytical instrument (such as a chromatograph) to control the analytical instrument and to process data.

BACKGROUND OF THE INVENTION

A data processor for an analytical instrument (such as a chromatograph) should include a main processing unit connected to the analytical instrument, a keyboard for the input device and a display for the output device. With appropriate software, a general personal computer can be used as a data processor. But a specialized data processor is desirable for an analytical instrument because a specialized circuit can process data from the analytical instrument faster than a general circuit and specialized direct command keys make the operation more convenient.

Referring to a notebook type personal computer, a compact data processor is proposed as in FIGS. 7 and 8. The data processor is composed of a main body 21, a keyboard 22 provided on the top of the main body 21, and a lid 23 pivotally connected to the main body 21. On one face of the lid 23 is provided an LCD (liquid crystal display) panel. When the data processor is used, the lid 23 is raised upright as shown in FIG. 7 with the LCD panel facing the front. When the data processor is not used, the lid 23 is tilted down on the main body 21 as shown in FIG. 8, in which case the keyboard 22 cannot be operated and the LCD panel cannot be seen.

There is often a case where the keyboard of the data processor is used only at the beginning of an analysis (e.g. for setting up the conditions of the analysis) and no keyboard operation is necessary afterwards when data is being gathered and sent from the analytical instrument to the data processor. In such a case, if the lid 23 is tilted down, the operator cannot see the LCD panel and cannot recognize the progress of the analysis. If, on the other hand, the lid 23 is raised up, the data processor occupies a large space, and an unintentional touch of the keyboard may arise, which may cause an error in the analytical system. Another disadvantage of the structure is that the maximum rising angle of the lid 23 is not large enough in some cases so that the operator has to bend low to look into the LCD panel.

When the data processor is used for a chromatograph, it is desirable that the operator can perform, when necessary, a complicated data processing (such as an intensive and many-sided data analysis on the data collected through an analysis or a development of a new analytical method) using a full keyboard (including the a to z alphabetical keys). Once an analysis is begun, it is necessary to use only a minimum number of keys to operate the analysis (e.g., start/stop of the analysis or minor changes in the analytical conditions). The other keys are unnecessary and may even bring about an unintentional touch causing malfunctions of the analytical instrument.

SUMMARY OF THE INVENTION

The data processor of the present invention is made to satisfy the contradictory requirements. According to the present invention, the data processor comprises:

a main body including a CPU for processing data;

a keyboard as an input device of the CPU provided at the top of the main body;

a pair of sliding rails provided at both sides of the keyboard, a pair of sliders each for sliding on one of the sliding rails;

a lid pivotally connected to the sliders at one side; and a display panel as an output device of the CPU attached on one face of the lid.

The data processor may further comprise a stopper, for at least one of the sliders, for stopping the slider at preset positions. Included among the preset positions are a position near the front end of the keyboard, and a position near the rear end of the keyboard. An example of the stopper is a side cover of the main body covering one of the slider rails. Cutouts formed in the side cover hold the slider when the side cover is closed.

When the data processor is not used, the sliders are located (and stopped) at the rear end position, and the lid is tilted down, whereby the keyboard is covered by the lid. It is desirable in this case that the display panel be attached on the lower face of the lid. When the display is not necessary while the CPU is working, the lid can also be tilted down with the display panel facing down to avoid accidental contact with the keyboard and to secure the analysis.

When the keyboard is used, the lid is raised with the sliders at the rear end position. After the keyboard operation is finished, the sliders are (and the lid is) moved to the front end position, and the main body can be drawn in a small space with the display raised up facing the front.

When the lid plate is tilted down with the sliders at the front end position, the data processor becomes compact and the display panel can be seen from the outside. Since the keyboard is covered by the lid, the keys are safe from accidental contact, and the operator can see the display without bending low.

An important variation of the present invention is a data processor in which the keyboard is divided into a large section and a small section, and the lid covers only the large section when the sliders are placed at the front end of the sliding rails and the lid is tilted down on the keyboard. Since the small section is uncovered by the lid when it is tilted down, those keys necessary in an analysis are accessible in the small section. Various general keys are included in the large section and are used when complicated operations are needed (such as a development of an analysis program).

Other features and variations of the invention are shown in the description of the preferred embodiments that follow.

BRIEF DESCRIPTION OF THE DRAWINGS

FIG. 10 is a plan view of the basic keyboard of the data processor of the second embodiment.

FIG. 11 is an example presentation of the display of the second embodiment.

DETAILED DESCRIPTION OF PREFERRED EMBODIMENTS

Figure 1:
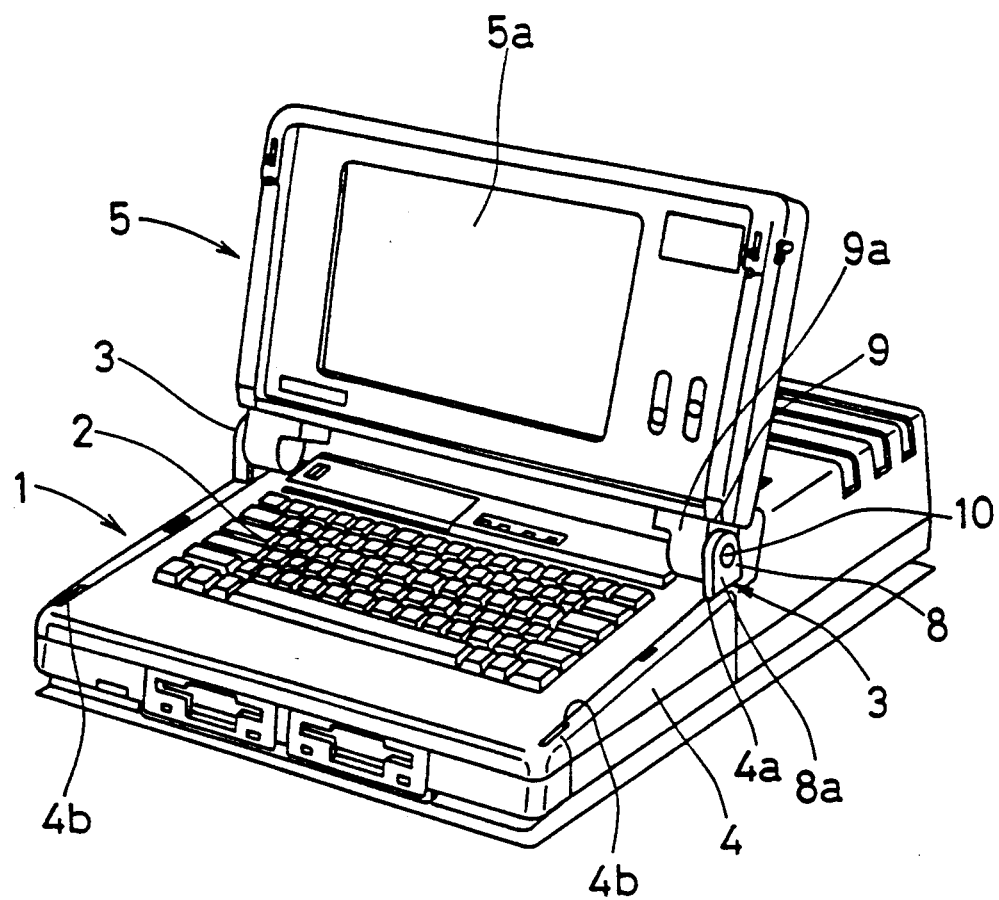
FIG. 1 is a perspective view of a data processor embodying the present invention.

A data processor as shown in FIG. 1 is now described as the first embodiment of the present invention. The data processor is composed of: a main body 1 including a CPU, ROM, RAM and other devices for processing data; a keyboard 2 provided on the top of the main body 1; a pair of sliding mechanisms 3 provided on the both sides of the keyboard 2; a pair of side covers 4 provided corresponding to the sliding mechanisms 3; and a display part 5. Two floppy disk drives (FDDs) are provided in the main body 1.

Figure 2:
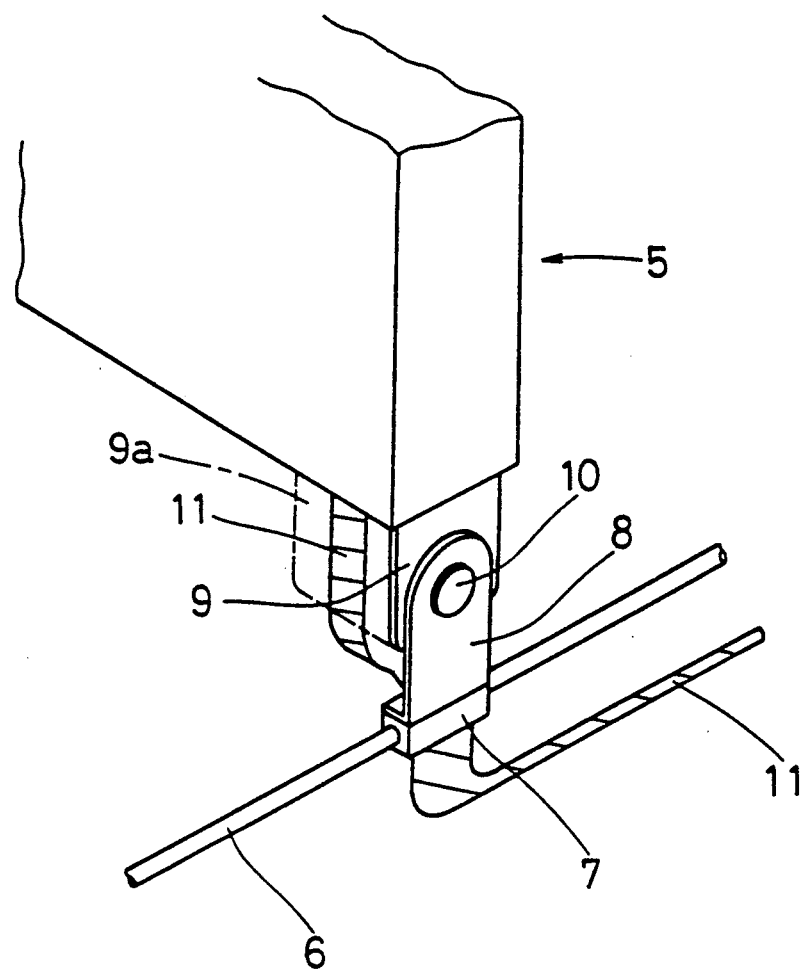
FIG. 2 is an enlarged view of a slider of the data processor of FIG. 1.

As shown in FIG. 2, a sliding mechanism 3 includes: a guide rail 6 concealed in the main body 1; a slider 7 sliding on the guide rail 6; and a pivot plate 8 fixed on the top of the slider 7. The guide rail 6 runs along a side of the keyboard 2.

As shown in FIG. 1, a side cover 4 corresponding to a sliding mechanism 3 has two cutout portions 4a and 4b at the rear and at the front of the data processor, for fixing the pivot plate 8 at respective positions when the side cover 4 is closed. When the side cover 4 is open, the slider 7 and the pivot plate 8 can move freely along the guide rail 6.

On one side of the display part 5 is provided a liquid crystal display (LCD) panel 5a, and the other side of the display part 5 is formed as a cover of the data processor. As shown in FIG. 2, a connector plate 9 extends downward from each of the lower corners of the display part 5. Each of the side plates 9 is connected to the corresponding pivot plate 8 by a pin 10 so that the display part 5 is sustained by the sliding mechanisms 3 and can rotate more than 180° on the pin 10. The display part 5 is electrically connected to the main body 1 by a flexible cable board 11. The connector plate 9 is covered by a case 9a and the pivot plate 8 is also covered by a case 8a (FIG. 1).

Figure 3:
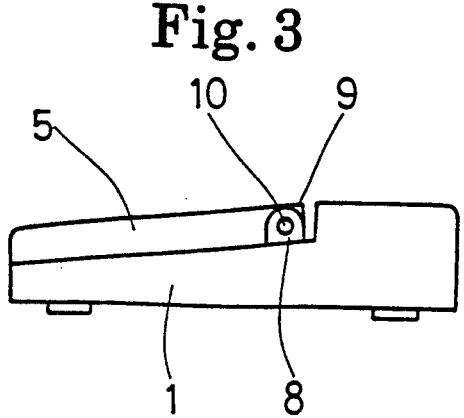
FIG. 3 is a side view of the data processor when the display part is tilted down with the sliders at the rear end of the sliding rails.

When the data processor is not used, or when the display is unnecessary while the CPU is working, the sliders 7 with the pivot plates 8 are placed at the rear end, and the display part 5 is tilted down with the LCD panel 5a faced down, as shown in FIG. 3.

Figure 4:
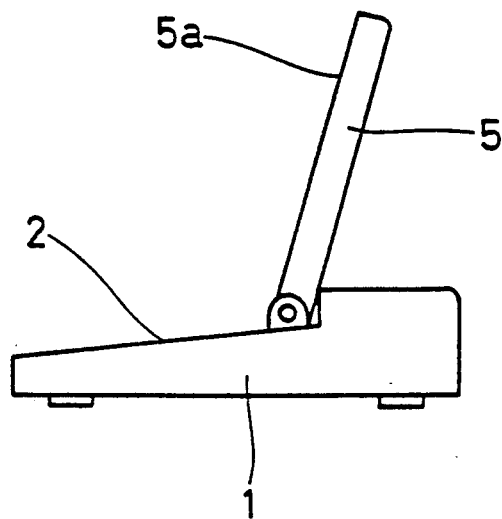
FIG. 4 is a side view of the same when the display part is raised up.

When the keyboard 2 is used, the display part 5 is raised up, as shown in FIG. 4, with the LCD panel facing front. Thus the operator can perform a complicated work operating the keyboard 2 and looking at the display on the LCD panel 5a. Since the side covers 4 are closed, the pivot plates 8 are held by the rear cutouts 4a of the side covers 4, and the display part 5 is fixed at the rear end of the keyboard 2.

Figure 5:
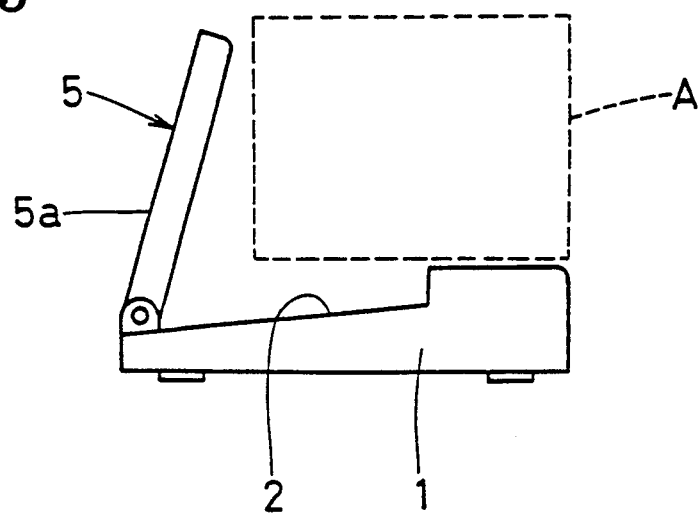
FIG. 5 is a side view of the same when the sliders are moved to the front end of the sliding rails with the display part remaining raised.

When an interactive operation of the data processor using the keyboard 2 is finished, and a secluded data processing, control of an instrument connected or data communication with external devices starts, the sliders 7 are slid on the guide rails 6 to the front end while the side covers 4 are opened to free the pivot plates 8. Then the side covers 4 are closed to hold the pivot plates 8 with the front cutoffs 4b, whereby the display part 5 is fixed at the front end of the keyboard 2, as shown in FIG. 5. In this case, the main body 1 can be drawn into a small space under another device A. Since the keyboard 2 is concealed behind the display part 5, accidental contact with the keyboard is avoided and the system is safe from an unintentional interruption. The floppy disk drives are still usable in this position.

Figure 6:
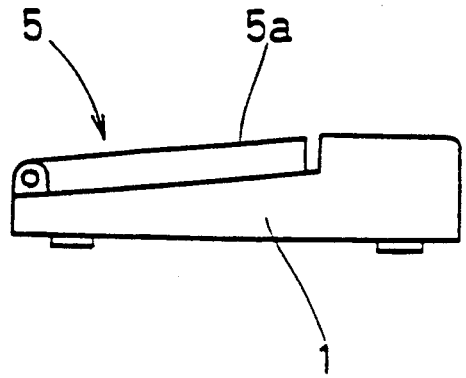
FIG. 6 is a side view of the same when the display part is then tilted down.
Figure 7:
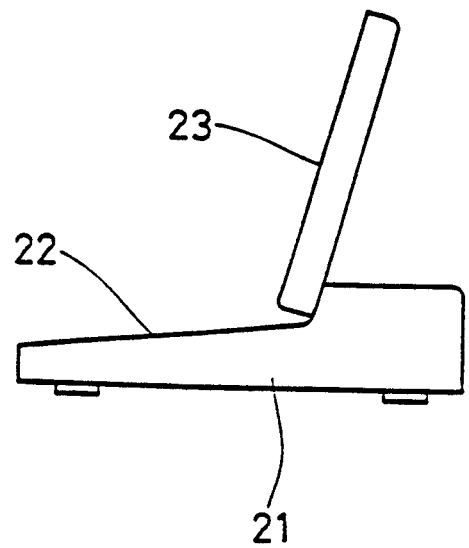
FIG. 7 is a side view of a conventional data processor.
Figure 8:
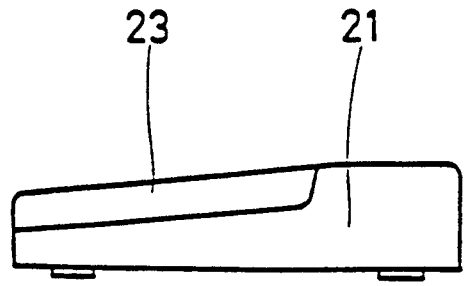
FIG. 8 is a side view of the same when the display part is tilted down.

Then the display part 5 can be tilted down backward, as shown in FIG. 6, to cover the whole keyboard 2. Since, in this case, the LCD panel 5a faces upward, the operator can look into the LCD panel 5a without bending low, and the entire data processor is compact while working.

In the above embodiment, cutouts 4a and 4b formed in the side covers 4 are used as the stopper. Any other form of stoppers can be used instead to stop the slider 7 and hold the display part 5 at an arbitrary position along the guide rails 6.

Figure 9:
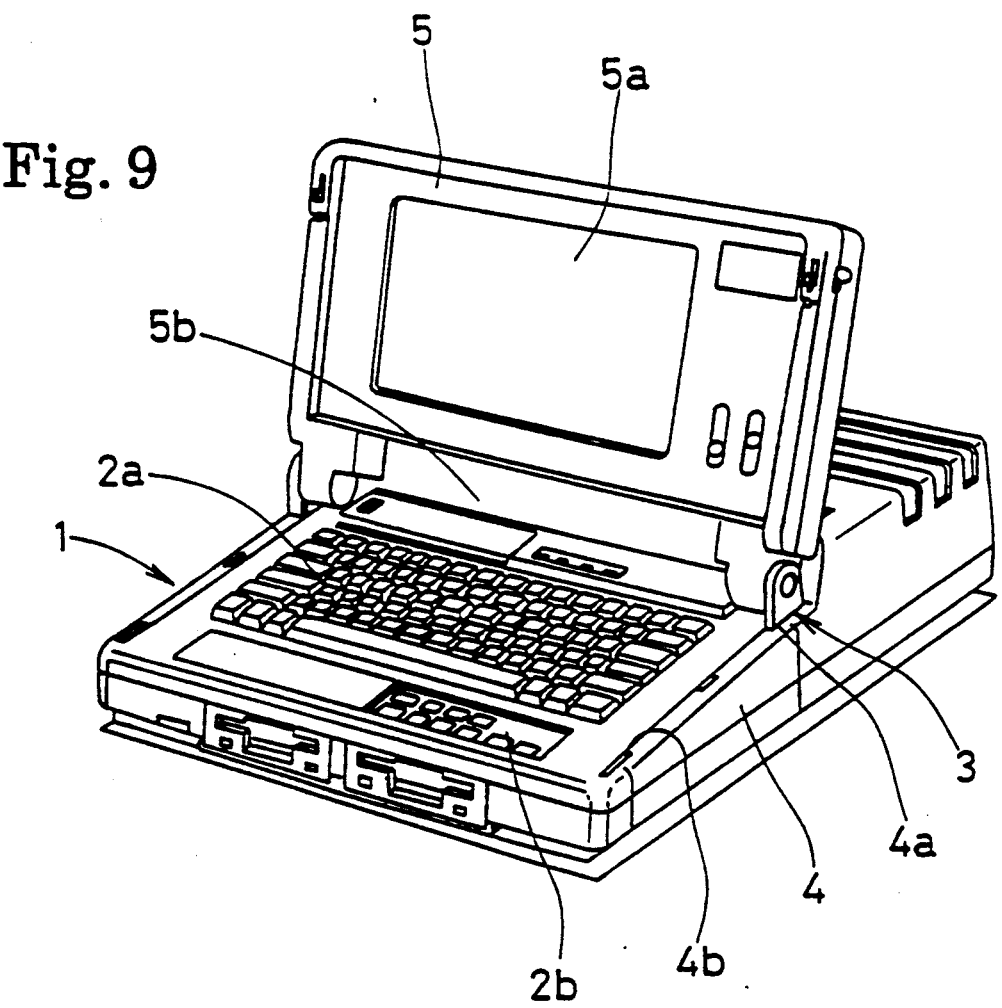
FIG. 9 is a perspective view of another data processor embodying the present invention.

The second embodiment of the present invention is now described referring to FIG. 9. The data processor of the present embodiment is used for a chromatograph and differs from the one in FIG. 1 in the keyboard 2 and in the display part 5. The keyboard 2 of this embodiment includes a large general keyboard 2a and a small basic keyboard 2b. The general keyboard 2a includes the a to z alphabetical keys and various other keys that can be used for general data processing, such as developing a new analytical method or program. The basic keyboard 2b includes, as shown in FIG. 10, START/STOP keys 12, a MENU key 13, an enter key 14, cursor movement keys 15-18, a control key 19, a shift key 20, which are used while a chromatographic analysis is being performed. The START/STOP keys 12 are provided for two analysis channels of the chromatograph to start and end the analyses respectively, and the MENU key 13 is for opening (and closing) a menu on the display screen of the LCD panel 5a.

The lower side of the display part 5 of the present embodiment is higher than that of the previous embodiment (FIG. 1), and a larger space 5b is provided between the keyboard 2 and the display part 5 when the display part 5 is raised up. Thus, when the sliders 7 are located at the front end and the display part 5 is tilted down backward with the LCD panel 5a facing upward, the display part 5 does not hide the basic keyboard 5b owing to the space 5b.

When the data processor of the present embodiment is not used, the sliders 7 are moved to the rear end and display part 5 is tilted down forward as shown in FIG. 3. In this case, the LCD panel 5a faces down.

When the data processor is used, the display part 5 is raised up as shown in FIG. 4. Since, in this case, the entire keyboard 2 including the general keyboard 2a is operable, development of a new analytical method (such as setting up an optimal analytical condition or parameters) or complicated analysis on the data collected through an analysis is possible.

When an analysis is performed by the chromatograph connected to the data processor, the sliders 7 are moved to the front end and the display part 5 is tilted down backward as shown in FIG. 6. In this case, as described above, the basic keyboard 2b is not covered by the display part 5 owing to the space 5b, and basic operations necessary to conduct an analysis are possible, for example, to start/stop an analysis or load analytical conditions. Since the general keyboard 2a is hidden under the display part 5, an unintentional touch is avoided. The operator can watch the progress of the analysis through the display of the LCD panel 5a.

An example of the display presented while a chromatographic analysis is performed is shown in FIG. 11. When this figure is presented, the operator can choose one of the listed items 1 through 8 (1:Chromatogram Monitor to 8:GC file) using the cursor movement keys 15-18. That is, the operating program is adequately prepared in the data processor of the present embodiment so that the operator can perform basic operations (e.g., loading a necessary file, executing a command, or opening a help window) of a chromatographic analysis by using the keys of the basic keyboard 2b (cursor keys 15-18, enter key 14, etc.).

What is claimed is:

1. A data processor comprising:
   a main body including a CPU for processing data;
   a keyboard as an input device of the CPU provided at a top of the main body;
   a pair of sliding rails provided along both sides of the keyboard;
   a pair of sliders, each one of the sliders sliding on one of the pair of sliding rails;
   a lid pivotably connected to the pair of sliders; and
   a display panel as an output device of the CPU attached to one face of the lid.

2. The data processor according to claim 1, where the data processor further comprises a stopper for at least one of the sliders for stopping the slider at a plurality of preset positions, the preset positions including a first position near a front end of the keyboard and a second position near a rear end of the keyboard.

3. The data processor according to claim 2, where the stopper is a side cover of the main body having a cutout for stopping the slider.

4. The data processor according to claim 1, where the lid covers the whole keyboard when the sliders are slid to a front end position of the sliding rails and the lid is tilted down on the keyboard.

5. The data processor according to claim 1, where the display panel is provided on a front face of the lid when the lid is raised.

6. The data processor according to claim 1, where the main body includes a floppy disk drive having an entrance, said entrance placed at a front end of the main body.

7. The data processor according to claim 1, where the keyboard comprises a large section and a small section, and the lid covers only the large section when the pair of sliders are slid to a front end position of each of the sliding rails and the lid is tilted down.

8. The data processor according to claim 7, where the data processor is connectable to an analytical instrument, and the small section of the keyboard includes those keys necessary for basic operations of the analytical instrument.

9. The data processor according to claim 7, where the data processor further comprises a stopper for at least one of the sliders for stopping the slider at a plurality of preset positions, the positions including a first position near a front end of the keyboard and a second position near a rear end of the keyboard.

10. The data processor according to claim 9, where the stopper is a side cover of the main body having a cutout for stopping the slider.

11. The data processor according to claim 7, where the main body includes a flopping disk drive having an entrance, said entrance placed at a front end of the data processor.

12. The data processor according to claim 7, where the display panel is provided on a front face of the lid when the lid is raised.

* * * * *